United States Patent [19]

Chickowski

[11] 3,996,033
[45] Dec. 7, 1976

[54] METHOD AND APPARATUS FOR CONTROLLING GLASS FIBER COATING

[75] Inventor: James E. Chickowski, Arnold, Pa.
[73] Assignee: PPG Industries, Inc., Pittsburgh, Pa.
[22] Filed: Apr. 2, 1976
[21] Appl. No.: 673,168
[52] U.S. Cl. .............................. 65/3 C; 65/11 W; 65/374 M; 118/68; 118/69; 427/385 A
[51] Int. Cl.² .................. C03C 25/02; C03B 37/02
[58] Field of Search ............... 65/38, 3 C, 2, 11 W, 65/12, 1, 374 M; 427/385 A, 386; 118/68, 69

[56] References Cited
UNITED STATES PATENTS

| 3,251,665 | 5/1966 | Bour | 65/2 |
|---|---|---|---|
| 3,414,956 | 10/1968 | Genson | 65/3 X |
| 3,695,858 | 10/1972 | Russell | 65/2 |
| 3,718,448 | 2/1973 | Drummond et al. | 65/3 C |
| 3,759,681 | 9/1973 | Russell | 65/12 |
| 3,846,097 | 11/1974 | Russell | 65/2 |
| 3,865,565 | 2/1975 | Spence et al. | 65/2 |
| 3,902,878 | 9/1975 | Hoag et al. | 65/3 C |
| 3,918,947 | 11/1975 | Maaghul | 65/3 C |
| R24,060 | 9/1955 | Russell | 65/12 |

Primary Examiner—Robert L. Lindsay, Jr.
Attorney, Agent, or Firm—Alan T. McDonald

[57] ABSTRACT

A novel method and apparatus is disclosed for the coating of glass filaments to be used in elastomer and resin reinforcement. The invention includes a strand separator for dividing filaments from a glass fiber forming operation into a plurality of strands. The separator is cooled with a fluid so that heat from the oven used to cure the coating applied to the glass filaments will not heat the separator to such a degree that the coating dries and cures on the separator.

9 Claims, 4 Drawing Figures

METHOD AND APPARATUS FOR CONTROLLING GLASS FIBER COATING

BACKGROUND OF THE INVENTION

In U.S. Pat. No. 3,718,448, which is assigned to the assignee of the present invention and which is incorporated herein by reference, a method and apparatus for coating glass filaments with heat curable elastomers and resins is shown. In this process, the filaments from the fiber forming bushing are coated with heat curable elastomers or resins, are then combined into a plurality of strands. The plurality of strands so formed are then subjected to drying. The patent states that the gathering of the filaments into a plurality of strands may be accomplished either by using the surface tension of the coating employed or by employing a mechanical separator. The drying step eliminates the moisture from the strands and, at least partially, cures the resin or elastomeric coating on the strands.

Mechanical separators have the advantage over a "natural" split (i.e., using the surface tension phenomenon) in that a precise number of filaments in each strand can be assured. This precision is not possible when surface tension alone is used to form the strands. Further, mechanical separators readily allow for changes in the number of filaments in each strand or the number of strands being formed.

While separators are very useful in producing uniform strands, they do cause some problems. When used in a direct coating process such as described in U.S. Pat. No. 3,718,448, the separators typically used are formed of a metal, such as brass, and usually take the form of a comb having a plurality of prongs. The prongs are located such that the filaments are directed between pairs of the prongs and are gathered into strands by the prongs. The separator, if used in the process of the aforementioned patent, is located slightly above a dielectric oven or some other oven which supplies heat for drying and at least partially curing the coating on the strands. This heat, of course, rises in the direction of the separator. Because the separator is typically constructed of a metal, the separator tends to absorb heat rising from the oven rapidly. Eventually, the separator will reach a temperature where excess coating material which scrapes off of the filaments as they pass through the separator remains on the separator surface and will begin to dry, cure, and thus harden. As the fragile glass filaments pass between the prongs of the separator, contact with this dried and hardened material will cause the filaments to break out, thus necessitating stoppage in which is desired to be a continuous process. To reduce strand breaks of this nature, it is necessary to shut down the operation frequently and either clean or replace the strand separator. This, too, results in down time for the system which is not desirable. Further, cleaning of the strand separator is both time consuming and difficult depending upon the nature of the hardened coating material accumulated thereon.

For these reasons, it is desirable to mechanically separate glass filaments in a direct coating forming operation into a plurality of precise strands without the coating material for the glass filaments fouling the separator used.

THE PRESENT INVENTION

By means of the present invention, such separation of glass filaments into strands is possible. A strand separator is provided which is cooled by means of a cooling fluid flowing therethrough to prevent coating material which has accumulated on the separator from drying, curing and thus hardening on the surface. Such a separator decreases filament breakout in a direct coating operation since no hardened coating material is allowed to accumulate on the separator. Further, cleaning of the separator is required less frequently, and cleaning is far simpler, since there is no hardened material adhering to the separator surfaces. The operation of the novel method and apparatus results in a smoother operation of the coating and drying system which, when used to direct coated glass filaments, increases its productivity by eliminating the frequency of breakouts caused by separator fouling.

DETAILED DESCRIPTION OF THE DRAWINGS

Figure 1:
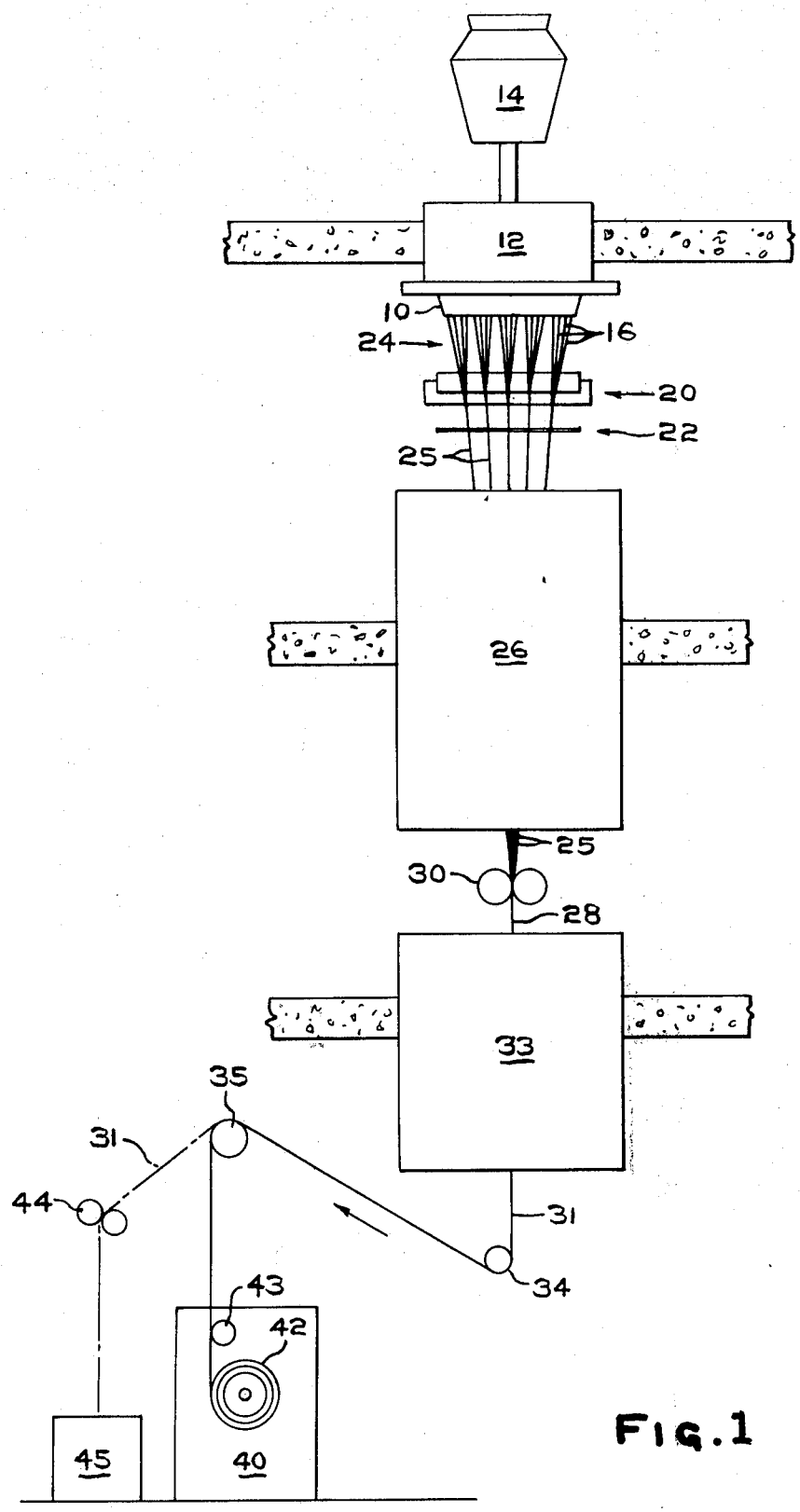
FIG. 1 is a diagrammatic elevation of a glass fiber strand forming and coating operation.

In FIG. 1 of the drawing, there is shown a direct fiber forming and coating apparatus composed of a bushing 10 connected to a premelter 12 which is automatically fed with glass marbles from a supply hopper 14 in a conventional manner. Alternatively, the bushing can be connected to the forehearth of a glass melting tank in any conventional manner. A plurality of glass filaments 16 are drawn from cones of glass suspended from tips in the bottom of the bushing. The number of filaments can range from about 200 to 6,000 or more.

The individual fibers or filaments 16 pass over an applicator such as a roller coating applicator 20 as described in U.S. Pat. No. 2,873,718. Of course, other applications, such as belt applicator, could also be employed. An aqueous roving resin size or an aqueous elastomeric adhesive dip such as those described in U.S. Pat. Nos. 2,691,614; 2,817,616 and 2,822,311 is applied to the individual fibers 16 as they pass over the rotating applicator 20. The surface tension of the coating brings the fibers together into spaced apart groups at the applicator 20. However, to more precisely control the number of filaments in each strand and to precisely control the number of strands formed, a mechanical separator 22 is located below the applicator 20. This separator will be more fully described below. The separator gathers the filaments 16 into a plurality of strands 25.

The strands 25 of coated fibers then proceed downwardly through a dielectric oven 26 in a first heating zone which electrically heats the coated fibers to remove the water from the coating. The strands 25 are spaced about 0.5 inch (1.27 centimeter) from each other as they enter the oven 26 and they gradually come closer to each other as they pass through the oven. The length of the oven 26 is such that sufficient heat is applied to remove the water from the coating.

For example, with strands 25 containing about 25 fibers each and traveling at about 2,000 feet per minute (609.6 meters per minute), a dielectric oven 15 feet (4.572 meters) in length designed to provide 10 kilovolt amphers is suitable. In place of dielectric oven 26, an oven utilizing hot gases or an infrared radiant heating source may be used to dry the strands 25. Such heat treatment usually serves to partially cure any curable ingredients in the coating. Glass fibers in each strand 25 are bonded together throughout their lengths.

The strands 25 of coated fibers are joined together into a composite strand 28 as they pass over a pair of graphite gathering shoes 30. Thereafter, the composite strand 28 passes through another heating zone 33 wherein additional heat is applied to the coated fibers to further cure the coating.

The heat in the second heating zone 33 can be applied in a similar manner to that applied to the first zone, i.e., by means of a dielectric oven 33, hot gas or a radiant heated oven, but is preferably a forced hot air oven. The first and second heating zones mentioned above can be two separate zones in a single oven. The dividing point in the oven in such as instance is that point in the oven where the strands 25 are grouped to join into a composite strand 28.

After leaving the second heating zone 33, the coated and cured strand 28 passes oven suitable guides 34 and 35 to a glass fiber strand forming winder 40 such as illustrated in U.S. Pat. Nos. 3,041,662; 3,151,963 and 3,256,079. The forming winder is run at a relatively slow speed, i.e., at about 500 up to 5,000 feet per minute (152.4 up to 1524 meters per minute). A cylindrical package 42 with an open wind is produced by means of a suitable conventional traverse 43. Alternatively, the strands 25 of fibers 16 can be joined into a roving 31 after passing through a single oven and before being wound on a forming package or chopped into short discontinuous strands.

Figure 2:
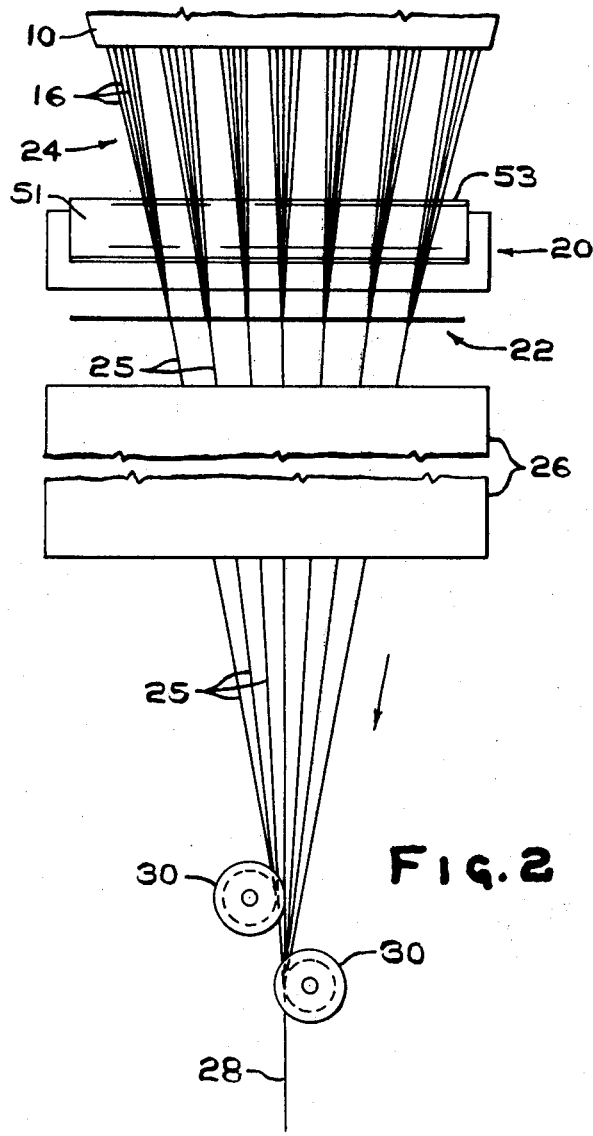
FIG. 2 is an enlarged view of a portion of the operation shown in FIG. 1.
Figure 3:
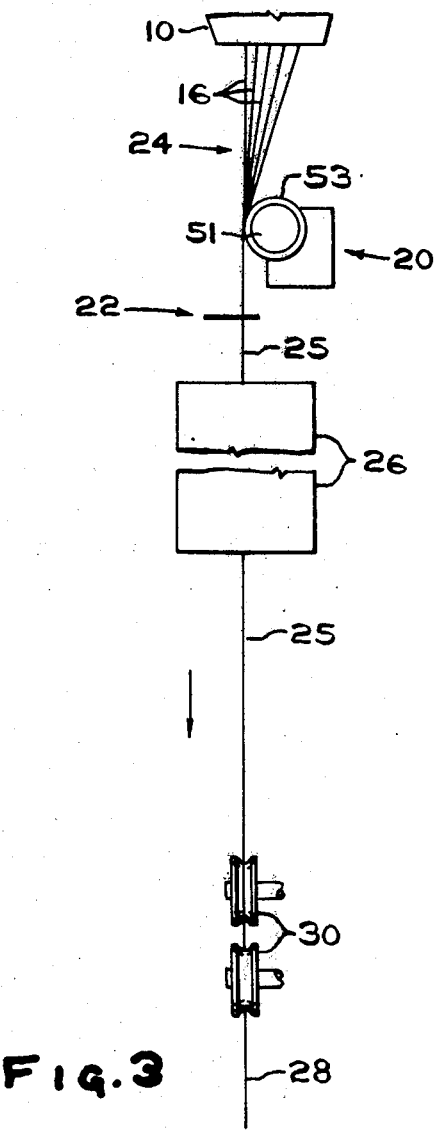
FIG. 3 is a side view of FIG. 2 illustrating the arrangement of the glass fibers as they pass through a portion of the forming and coating operation.

In FIGS. 2 and 3, a portion of the coating apparatus is shown in diagrammatic form on an enlarged basis. The individual fibers 16 are formed in small inverted pyramid-shaped groups 24 containing, for example, 10 to 50 fibers in each group. These fibers first contact the roller 51 in a slightly spaced side by side relation. As they move over the surface of the roller 51, they tend to first move together in a ribbon and then fold over on each other as they leave the surface of the coated roller. The layer of coating 53 which is picked up by the fibers 16 from the roller then tends by surface tension to hold fibers 16 together in a unitary group which tends to be round or oval shaped in cross section. This grouping is heightened by the separating and gathering actions of the strand separator 22. These strands 25 present a much greater surface area for drying the coated glass fibers than if they were consolidated into the composite strand 28 before drying. Hence, the drying rate is much faster and the coating of the strand can proceed at a much faster rate in a much smaller oven.

Figure 4:
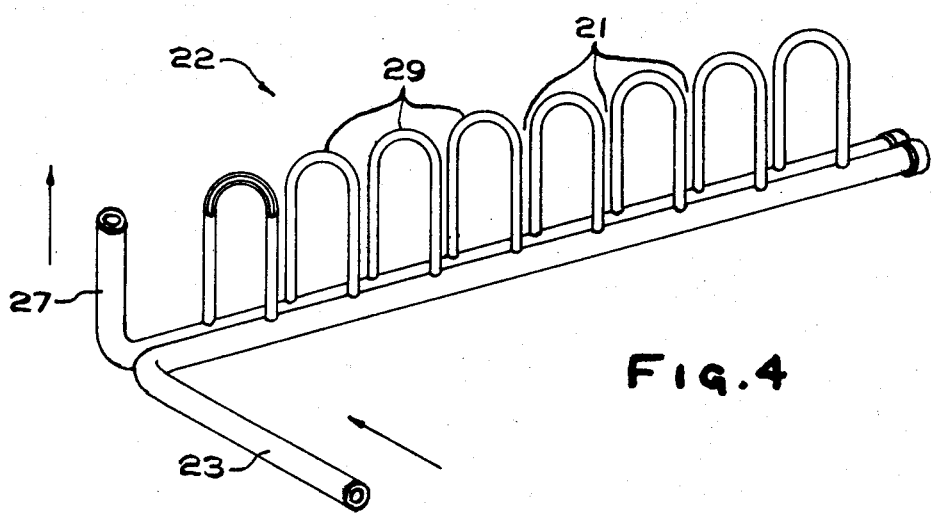
FIG. 4 if a perspective view of the novel strand separator employed in the present invention.

The strands separator employed in the present invention is shown in FIG. 4. The separator 22 comprises an inlet tube 23, a plurality of loops or spacers 29 and an exit tube 27. The inlet tube 23 and the exit tube 27 are hollow tubes which are sealed at one end by welding, by end caps, or the like. The spacers 29 are also hollow tubes and are connected at their ends to the inlet tube 23 and the outlet tube 27 through suitable openings in the inlet tube 23 and the outlet tube 27. Fluid enters the inlet tube 23 continuously as the coating system is in operation. The fluid cannot exit the inlet tube 23 in any manner except by passing through the hollow spacers 29 and out of the exit tube 27.

The fluid which is passed through the separator 22 can be any fluid capable of absorbing heat and removing the heat from the separator 22. Suitable fluids include gaseous fluids such as air, oxygen, nitrogen, and the like and liquid fluids such as water, DOWTHERM, and other like heat transfer liquids. The fluid passes through the separator 22 but does not come into contact with the strands 25.

The separator 22 is formed of a material which is both resistant to abrasion of the glass strands passing therethrough and which will allow heat to readily pass through it to be absorbed by the flowing cooling fluid. A particularly suitable material is stainless steel tubing. Other metals, such as brass may also be employed.

In operation, the glass filaments pass through the openings 21 between the spacers or loops 29 where they are divided into a plurality of strands 25. Due to the looped shape of the separator, it is simple to remove one or more filaments from a given strand and transfer them to an adjacent strand or to a vacant opening 21 to precisely determine filament count of a given strand and/or to increase or decrease the number of strands being formed. Thus, such a separator allows precise determination of the strand formation in the coating system.

Due to the cooling effect of the fluid passing through the hollow tube of the separator, coating material which remains on the separator as the glass strands pass therethrough does not readily dry, cure and harden. This substantially reduces breakout of the filaments due to the filaments catching on hardened coating material. It also increases substantially the time between necessary cleanings of the separator as well as reducing the time necessary to clean the separator.

EXAMPLE

Using the apparatus illustrated in the drawings, 1000 K-15 glass filaments were drawn from a bushing at a speed of 820 feet per minute (249.9 meters per minute). The filaments coated with an elastomeric latex material or an applicator were divided into 9 strands, each strand containing approximately 111 filaments, using the strand separator 22. Cooling water was passed through the separator 22 continuously at an incoming temperature of approximately 68° F. and at a rate of approximately 1 gallon per minute. The strands were then combined into a roving and wound into a package. 25 runs of approximately 1 hour each were made in this manner.

No breakouts were observed due to dried and cured elastomer on the strand separator. Fewer cleanings of the separator were necessary than with conventional strand separating apparatus. The present separator was cleaned about once in 8 hours as compared to once an hour for an uncooled separator.

As can be seen from the foregoing, the present invention provides an efficient method and apparatus for coating glass strands which reduces down time of the system and breakout of the strands.

While the invention has been described with reference to certain specific examples and illustrated embodiments, it is not intended to be limited thereby, except insofar as appears in the accompanying claims.

I claim:

1. In an apparatus for coating glass filaments with a heat curable coating material comprising a bushing having bushing tips through which said filaments are drawn, an applicator for applying said heat curable coating materials to said filaments, a strand separator for dividing said filaments into a plurality of separate strands, a first heating zone, means for consolidating said strands into a roving, a second heating zone and means for collecting said roving, the improvement wherein said strand separator comprises a hollow inlet tube, a hollow exit tube, and a plurality of hollow spacers connected to permit a heat transfer fluid to pass from said inlet tube through said spacers and out said exit tube to provide cooling of said strand separator whereby said heat curable coating material will not harden on said strand separator, and a heat transfer fluid passing through said strand separator to provide said cooling.

2. The apparatus of claim 1 wherein said fluid is water.

3. The apparatus of claim 1 wherein said strand separator is formed of brass.

4. In a method of forming glass fibers which comprises pulling glass fibers from molten glass through orifice tips in a bushing, applying a heat curable coating to the filaments, separating said filaments into a plurality of strands by passing said filaments through a plurality of openings in a strand separator, and subsequently passing the strands through a heating zone, the improvement comprising continuously cooling said strand separator by passing a heat transfer fluid through the separator but out of contact with the strand by thereby prevent drying of said heat curable coating on said strand separator surface.

5. The method of claim 4 wherein said cooling comprises forming said strand separator with a hollow inlet tube closed at one end, a hollow exit tube closed at one end, and a plurality of hollow spacers connected to permit said heat transfer fluid to pass through said inlet tube, through said spacers, and through said exit tube, and passing the heat transfer fluid through said strand separator.

6. The method of claim 5 wherein said fluid is water.

7. The method of claim 5 wherein said strand separator is formed of brass.

8. The method of claim 5 wherein said strand separator is formed of stainless steel.

9. The apparatus of claim 1 wherein said strand separator is formed of stainless steel.

* * * * *